(12) United States Patent
Burgoni et al.

(10) Patent No.: US 6,349,739 B1
(45) Date of Patent: Feb. 26, 2002

(54) MULTI-COMPONENT METALLIC HOUSING FOR A FLUID

(75) Inventors: Joseph A. Burgoni, LaSalle; Jeffery J. Grobe, Ottawa; Gerald A. Horrie; John E. Myers, both of South Wilmington; Larry B. Sams, Chillicothe, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/307,575

(22) Filed: May 7, 1999

Related U.S. Application Data

(62) Division of application No. 08/779,295, filed on Jan. 6, 1997, now abandoned.

(51) Int. Cl.$^7$ ................................................. F16K 51/00
(52) U.S. Cl. ..................... 137/454.5; 251/366; 123/470; 285/390
(58) Field of Search ................................. 285/390, 333; 251/129.01, 129.15, 366; 137/454.5; 407/24; 123/190.1, 470

(56) References Cited

U.S. PATENT DOCUMENTS

| | | | |
|---|---|---|---|
| 1,179,397 A | 4/1916 | Breton | |
| 2,039,719 A | 5/1936 | Kline et al. | |
| 2,328,493 A | 8/1943 | Reaney | |
| 2,703,419 A | 3/1955 | Barth | |
| 3,343,458 A | 9/1967 | Larsson | |
| 3,391,588 A | 7/1968 | Brown | |
| 3,541,918 A | 11/1970 | Johnson | |
| 3,550,255 A | 12/1970 | Skierski | |
| 3,762,745 A | 10/1973 | Cunningham | |
| 3,866,510 A | 2/1975 | Eibes et al. | |
| 4,050,721 A | 9/1977 | Streit | |
| 4,081,873 A | 4/1978 | Lemonski | |
| 4,095,749 A | * 6/1978 | Campbell | 239/458 |
| 4,266,896 A | 5/1981 | Meier et al. | |
| 4,347,636 A | 9/1982 | Capuano | |
| 4,397,484 A | 8/1983 | Miller | |
| 4,487,433 A | 12/1984 | Miller | |
| 4,514,121 A | 4/1985 | Fuchs, Jr. | |
| 4,539,832 A | 9/1985 | Koller | |
| 4,661,031 A | 4/1987 | Heine | |
| 4,688,832 A | * 8/1987 | Ortloff et al. | 285/390 X |
| 4,735,115 A | 4/1988 | Yamada et al. | |
| 4,889,460 A | 12/1989 | Laidlaw et al. | |
| 5,101,906 A | 4/1992 | Corlin et al. | |
| 5,133,617 A | 7/1992 | Sokn et al. | |
| 5,137,397 A | 8/1992 | Koketsu | |
| 5,234,293 A | 8/1993 | Mena | |
| 5,320,457 A | 6/1994 | Erbes | |
| 5,320,467 A | 6/1994 | Erbes | |
| 5,522,624 A | 6/1996 | Edin | |
| 5,820,099 A | * 10/1998 | Rahbar et al. | 251/129.15 |
| 5,979,052 A | * 11/1999 | Horrie et al. | 29/890.126 |
| 6,120,067 A | * 9/2000 | Mosing et al. | 285/390 X |

FOREIGN PATENT DOCUMENTS

| | | |
|---|---|---|
| GB | 1 521 133 | 7/1975 |
| SU | 1042-908 A | 9/1983 |
| SU | 1227-375 A | 4/1986 |

\* cited by examiner

*Primary Examiner*—Kevin Lee
(74) *Attorney, Agent, or Firm*—Liell & McNeil

(57) ABSTRACT

A method of reducing metallic debris in a multi-component metallic housing for a fluid comprises the initial step of providing a first metallic component that includes a portion with a circular cross section and defines part of a fluid cavity when mated to a second component. A set of threads are machined on the circular portion and includes full threads separated by a beginning partial thread and an ending partial thread. Next, a substantial portion of at least one of the beginning partial thread or the ending partial thread is removed. The removal step could be performed either before or after the threads are actually cut into the first metallic component. The present invention finds one potential application in the manufacture of fuel injector components.

19 Claims, 3 Drawing Sheets

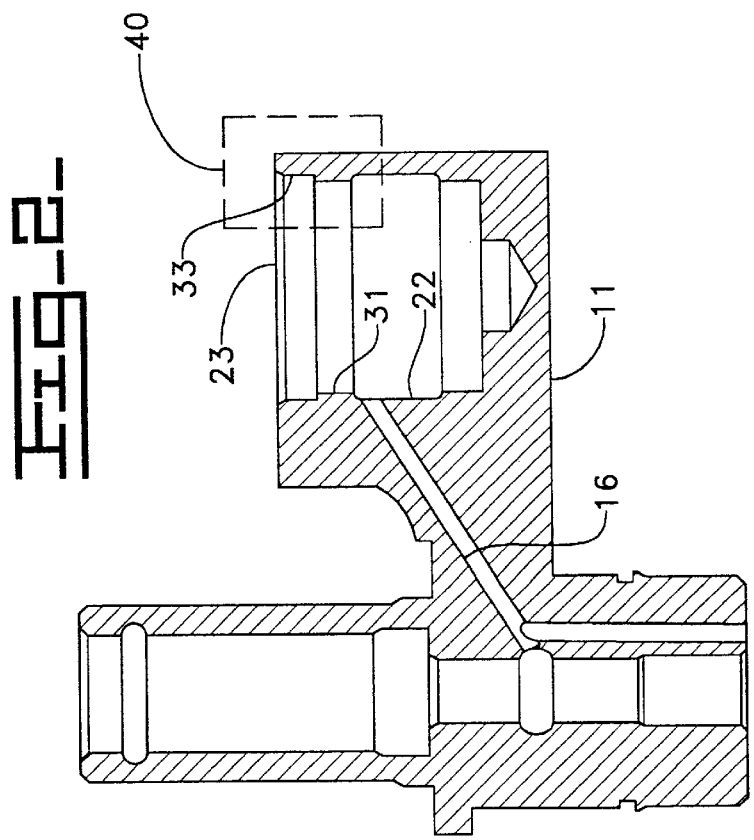
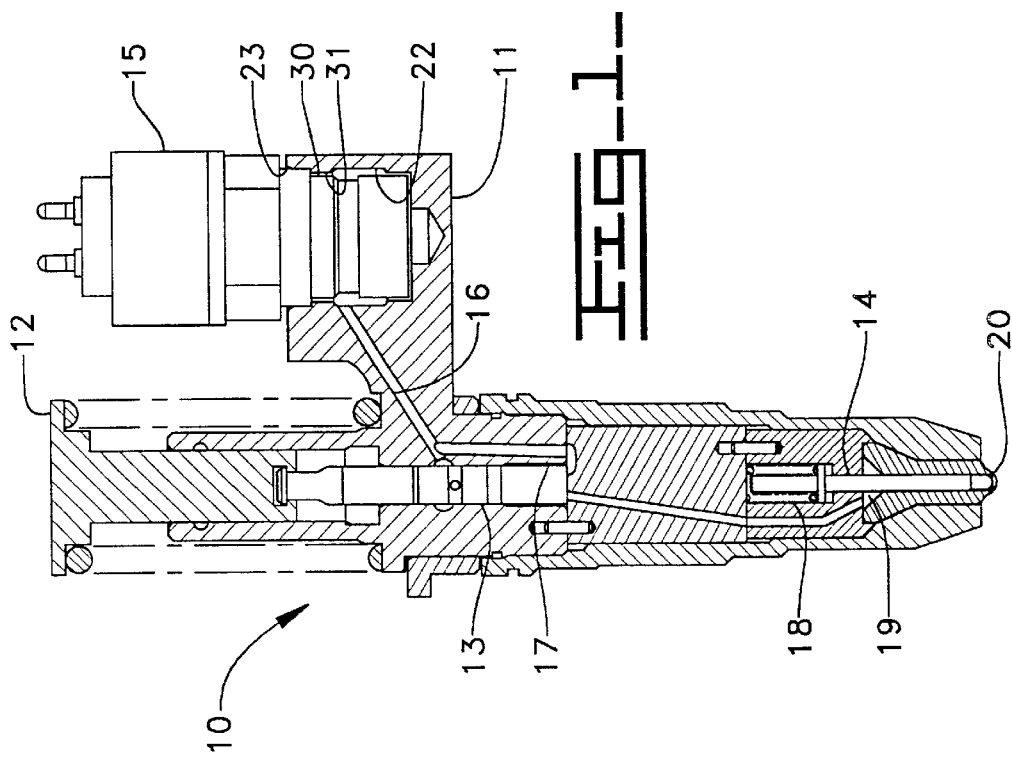

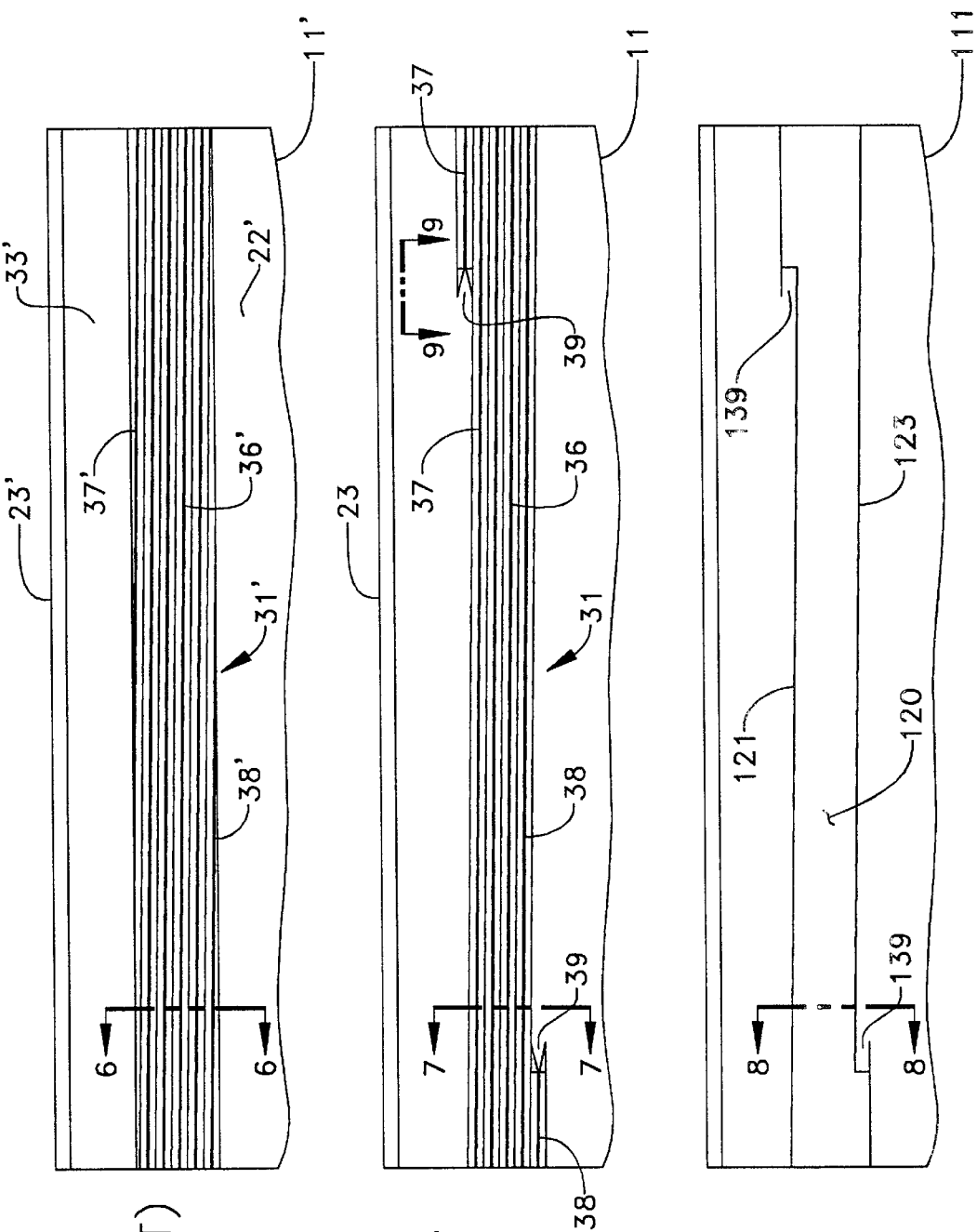

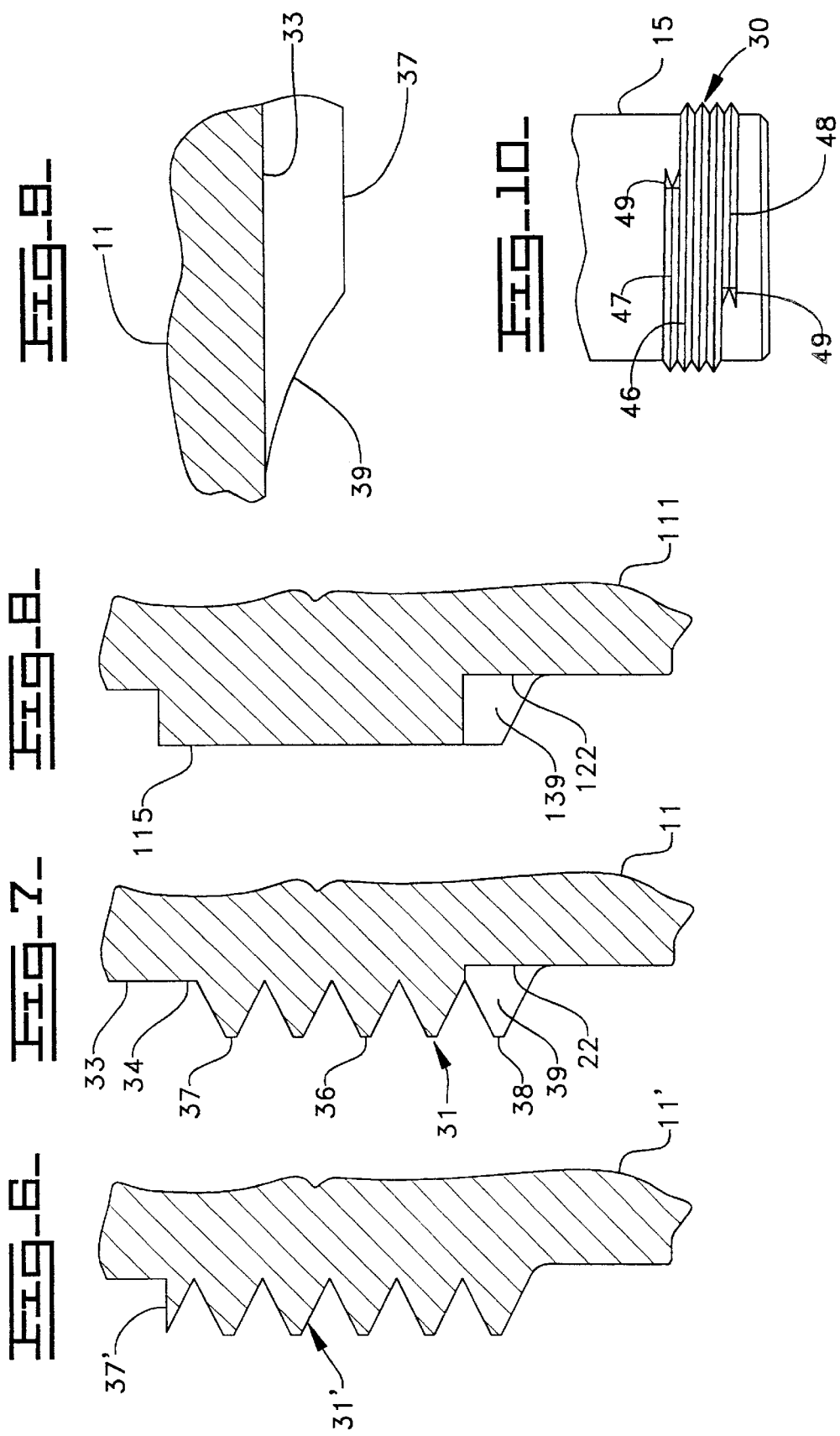

MULTI-COMPONENT METALLIC HOUSING FOR A FLUID

RELATION TO A PRIOR APPLICATION

This application is a division of application Ser. No. 08/779,295, filed on Jan. 6, 1997 now abandoned.

TECHNICAL FIELD

The present invention relates generally to a method of reducing metallic debris in a multi-component metallic housing, such as a fuel injector housing, and more particularly to the removal of first and last partial threads in metallic housing components.

BACKGROUND ART

Multi-component metallic housings are used for fluid transfer in numerous shapes and sizes, and in a wide variety of arts. In its simplest form, such a multi-component housing includes a first component defining a cavity with internal threads, and a second male component with external threads that threadably attaches to the first component to form a housing. Depending upon the particular application, a fluid is contained within, and often transferred through, the housing. In some applications, it is of critical importance that the fluid be free of particulate debris, such as metallic fragments. One potential source of metallic debris in a multi-component housing is due to the breakage of partial threads when the multi-component housing is assembled.

In one specific example, a fuel injector body is made up of several components assembled to one another by matching internal threads with one component with external threads on another component. As is typical in the art, when the various components of the injector body are machined, the threaded portions include partial beginning and ending threads that are thin and often become brittle after heat treatment. These partial threads are one major source of internal debris in fuel injectors. When the injector is assembled, the mating threads of one component sometimes tend to knock pieces of the thin partial threads free. In some cases, the debris is carried through the injector by fuel flow, which can cause injector plunger seizures and/or plugging of the injector tip orifices. Those skilled in the art will appreciate that both of these situations are extremely undesirable.

The present invention is directed to overcoming one or more of the problems as set forth above.

DISCLOSURE OF THE INVENTION

In responding to this need, the present invention contemplates a method of reducing internal metallic debris in a fuel injector by providing a fuel injector component having a portion with a circular cross section. A set of threads are machined on the portion and includes full threads separated by a beginning partial thread and an ending partial thread. A substantial portion of at least one of the beginning partial thread or the ending partial thread is removed, preferably utilizing a milling process. Thus, internal metallic debris within the fuel injector is reduced since one potential source of such debris is eliminated.

In another embodiment of the present invention, a multi-component metallic housing for a fluid includes a first metallic component defining a cavity that includes a set of internal threads. A second metallic component has an outer surface with a set of external threads mated to the internal threads such that the first component and the second component are attached to one another and define a fluid cavity. The set of internal threads includes a first internal thread and a last internal thread. The set of external threads includes a first external thread and a last external thread. At least one of the first internal thread, the last internal thread, the first external thread or the last external thread is substantially uniform.

One object of the present invention is to reduce internal metallic debris in fuel injectors.

Another object of the present invention is to reduce metallic debris in multi-component metallic housings that are sensitive to loose metallic debris.

Still another object of the present invention is to improve the manufacturing process for fuel injectors and other multi-component metallic housings for fluids.

BRIEF DESCRIPTION OF THE DRAWINGS

FIG. 1 is a sectioned side elevational view of a fuel injector incorporating fuel injector housing components according to the present invention.

FIG. 2 is a sectioned side elevational view of a fuel injector housing component according to the present invention.

FIG. 3 is an unrolled side elevational view of the internal threads of a fuel injector housing component according to the prior art.

FIG. 4 is an unrolled side elevational view of the internal threads of a fuel injector housing component according to the present invention.

FIG. 5 is an unrolled side elevational view of a fuel injector component cavity before being machined to include internal threads, according to one embodiment of the present invention.

FIG. 6 is a partial sectioned side elevational view of threads according to the prior art, and taken along section lines 6—6 of FIG. 3.

FIG. 7 is a partial sectioned side elevational view of a set of threads as viewed along section lines 7—7 of FIG. 4.

FIG. 8 is a partial sectioned side elevational view along section lines 8—8 of FIG. 5.

FIG. 9 is a partial sectioned top view along section lines 9—9 of FIG. 4.

FIG. 10 is a partial front view of an externally threaded fuel injector component according to the present invention.

BEST MODE FOR CARRYING OUT THE INVENTION

FIG. 1 shows a cam driven fuel injector 10 of a type manufactured and sold by Caterpillar, Inc. of Peoria, Ill. The fuel injector includes a housing component 11, a cam driven tappet 12, a plunger 13 and a needle check valve 14. Fuel enters a fuel pressurization chamber 17 via a fuel transfer passage 16 machined into housing component 11. A control valve assembly component 15 is received in the opening 23 of a cavity 22 made in housing component 11. Housing component 11 and control valve assembly component 15 are mated to one another in a manner well known in the art through the use of matching internal and external threads, respectively. When these two components are mated, metallic fragments from the partial beginning and ending threads of one or both of the components sometimes break free and find their way into fluid cavity 22. During the operation of injector 10, this metallic debris sometimes finds its way through fuel flow into undesirable locations within the fuel injector.

Each injection event is initiated by a cam (not shown) driving tappet 12 downward. The movement of tappet 12 in turns drives plunger 13 downward compressing fuel within fuel pressurization chamber 17. When the precise time to inject fuel has arrived, an electronic signal to control valve assembly component 15 activates a solenoid which blocks flow from fuel transfer passage 16. This causes fuel pressure within fuel pressurization chamber 17 to quickly rise to a valve opening pressure which causes needle check 14 to lift and open nozzle orifices 20. When this occurs, fuel from fuel pressurization chamber 17 flows through nozzle supply passage 18 into nozzle chamber 19 and eventually out of nozzle orifices 20. Each injection event is ended by de-energizing the solenoid within control valve assembly component 15 allowing fuel to escape from fuel pressurization chamber 17 through passage 16, resulting in a fuel pressure drop which allows needle check 14 to close. Between injection events, tappet 12 is returned to its initial position by a compression spring. This in turn causes plunger 13 to retract upward drawing fuel into fuel pressurization chamber 17 from fuel transfer passage 16 for the next injection event.

Referring now to FIG. 2, fuel injector housing component 11 is forged from a suitable metallic alloy and then machined to include a fluid cavity 22, the fuel transfer passage 16, as well as the barrel for the plunger. Cavity 22 includes a set of internal threads 31 that are separated from opening 23 by a cylindrical portion 33. After the various cavities, threads, passageways and other internal features of housing component 11 are machined, the component is heat treated to an appropriate hardness for use in a fuel injector. The area 40 containing internal threads 31 is shown in FIGS. 3, 4, and 5 in an unrolled 360 M view to best illustrate the prior art and the present invention.

Referring now to FIG. 3, a set of internal threads 31' includes full threads 36' bounded by a beginning partial thread 37' and an ending partial thread 38' in the cavity 22' of a fuel injector housing component 11' according to the prior art. Before internal threads 31' are machined into fuel injector housing component 11', cavity 22' includes an annular ridge bounded above and below by an annular ledge with a horizontal orientation. Partial beginning thread 37' and partial ending thread 38' are a direct result of the fact that the threads are formed in a spiral path at some pitch angle with respect to the centerline of cavity 22'. This configuration inherently results in rather sharp thin partial threads 37' and 38' as better illustrated in FIG. 6.

Referring now to FIG. 4, a fuel injector housing component 11 according to the present invention utilizes, in one embodiment, a component identical to that of the prior art before performing the method of the present invention. In particular, the partial beginning thread 37' and the partial ending thread 38' are milled away using a side milling tool, such as a MINIMIZER7. The end result is a first thread 37 and a last thread 38 that are both substantially uniform around the internal circumference of cavity 22. In this case, fuel injector housing component 11 is mounted on a horizontal machining center and the device is programmed for the side milling tool to follow the spiral path of the threads so that only the beginning and ending partial threads are removed. The curvature of the milling tool results in relatively short ramps 39 on either end of internal threads 31. The length of ramps 39 are of course dependent upon the diameter of the milling tool, but are preferably less than 5% of the circumference of cavity 22, so that first and last threads 37 and 38 can be considered to be substantially uniform. In the embodiment shown in FIG. 4, the partial beginning and ending threads are milled away after the set of threads 31 have been made.

In another embodiment of the present invention, illustrated in FIG. 5, the potential partial threads are milled away before the threads themselves are cut into the annular ridge 120. In other words, the first thread will begin at the upper ramp 139 and the last thread will end at the lower ramp 139. The annular ridge 120 is milled to have spiral shaped borders 121 and 123 that will match the pitch of the threads to be machined into the component part 111 in the next stage of manufacturing (not shown). After the threads are cut into component part 111, it will look substantially identical to housing component 11 shown in FIG. 4. Thus, the present invention contemplates removal of the partial threads either before or after the full threads are cut into the housing component.

FIG. 7 is of interest for showing a section through the housing component 11 through section lines 7—7 of FIG. 4. The partial beginning thread 37' (FIG. 6) has been milled away to a diameter 34, which should be greater than the peak diameter of the counterpart male component. In other words, there should be no more than the negligible step between cylindrical portion 33 and the area 34 corresponding to the removed partial beginning thread so that the threads of the counterpart male component do not contact area 34 creating unnecessary friction. This is especially important when the two housing components are mated together at a rated torque. With regard to last thread 38, the ending partial thread has been removed down to a level about equal with the diameter of cavity 22. This also insures that the threads of the counterpart male component do not make unnecessary contact and produce unexpected friction.

FIG. 9 is of interest for showing that the ramp 39 has an arcuate shape corresponding to the cutting diameter of the particular side milling tool utilized to remove the beginning and ending partial threads.

FIG. 8 shows a sectioned view along section lines 8—8 of FIG. 5. After the threads are cut into housing component 111, it would appear substantially identical to that shown in FIGS. 4 and 7. As discussed earlier, as an alternative, the milling operation revealed by FIGS. 5 and 8 allow the threads to be cut without a subsequent milling process, since the areas that would have resulted in the partial beginning and ending threads have already been removed.

FIG. 10 shows an example of a control valve assembly component 15 with a set of external threads 30 machined on its outer surface. As with the previous embodiments, the partial beginning and ending threads have been removed so that a first thread 47 and a last thread 48 are substantially uniform, and separated by full threads 46. The transition from the outer surface to the first thread 47 and the last thread 48 is a ramp 49 that is substantially identical to the ramps 39 described earlier. In other words, the shape of ramps 49 is primarily dependent upon the particular milling tool that is utilized to remove the beginning and ending partial threads.

Industrial Applicability

The present invention finds potential application in any situation where two or more metallic components are attached to one another through a threaded engagement. This of course assumes that the mating surfaces of the two components have a circular cross section. The practice of the present invention is most desirable in those cases where either partial beginning or partial ending threads have the possibility of breaking free and being circulated within a multi-component housing by fluid, causing damage to whatever machine is utilizing the multi-component housing. The present invention is especially applicable to fuel injectors since they typically include several moveable parts with rather tight clearances as well as extremely small outlet orifice diameters that can actually be smaller than the metallic debris that the present invention seeks to reduce.

The above description is intended for illustrative purposes only and is not intended to limit the scope of the present invention in any way.

For instance, while the removal of the beginning and ending partial threads is preferably accomplished through a milling operation, it is not inconceivable that other machining tools, such as a lathe, could not also accomplish the method of the present invention. What is important is that at least one of the beginning or ending partial threads is removed so that one potential source of metallic debris within a multi-component housing for a fluid is eliminated. Other objects and advantages of the present invention will no doubt become apparent to those skilled in the art after a close review of the attached drawings, the appended claims and the detailed description.

What is claimed is:

1. A multi-component metallic housing for a fluid comprising:
   a first metallic component defining a cavity that includes a set of internal threads;
   a second metallic component having an outer surface with a set of external threads mated to said internal threads such that said first component and second component are attached to one another and define a fluid cavity;
   at least one of said first metallic component and said second metallic component includes a fluid transfer passage opening to said fluid cavity;
   said set of internal threads including a first internal thread and a last internal thread;
   said set of external threads including a first external thread and a last external thread; and
   at least one of said first internal thread, said last internal thread, said first external thread or said last external thread being uniform.

2. The multi-component metallic housing of claim 1 wherein said set of internal threads are uniform.

3. The multi component metallic housing of claim 2 wherein said first metallic component is a fuel injector housing component;
   said fluid cavity is a fuel transfer cavity; and
   said second metallic component is an actuator valve assembly.

4. The multi-component metallic housing of claim 1 wherein said set of external threads are uniform.

5. The multi-component metallic housing of claim 1 wherein said set of external threads has a peak diameter; and
   a lower area adjacent said last internal thread has a diameter greater than said peak diameter.

6. The multi-component metallic housing of claim 1 wherein an upper area adjacent said first internal thread has a uniform diameter.

7. A valve comprising:
   a metallic housing component defining a cavity that includes a set of internal threads;
   a metallic valve assembly component having an outer surface with a set of external threads mated to said internal threads such that said housing component and said valve assembly component are attached to one another and define a fluid cavity;
   at least one of said housing component or said valve assembly component includes a fluid transfer passage opening to said fluid cavity;
   said set of internal threads including a first internal thread and a last external thread; and
   at least one of said first internal thread, said last internal thread, said first external thread or said last external thread being uniform.

8. The valve of claim 7 wherein said set of internal threads are uniform.

9. The valve of claim 8 wherein said set of external threads are uniform.

10. The valve of claim 9 wherein said set of external treads has a peak diameter; and
    a lower area adjacent said last internal thread has a diameter greater than said peak diameter.

11. The valve of claim 10 wherein an upper area adjacent said first internal thread has a uniform diameter.

12. The valve of claim 11 wherein said housing component is a fuel injector housing component;
    said fluid cavity is a fuel transfer cavity; and
    said fluid transfer passage is a fuel transfer passage.

13. A fuel injector comprising:
    a metallic fuel injector housing component defining a cavity that includes a set of internal threads;
    a metallic actuator valve assembly having an outer surface with a set of external threads mated to said internal threads such that said fuel injector housing component and said actuator valve assembly are attached to one another and define a fuel transfer cavity;
    said set of internal threads including a first internal thread and a last internal thread;
    said set of external threads including a first external thread and a last external thread; and
    at least one of said first internal thread, said last internal thread, said first external thread or said last external thread being uniform.

14. The fuel injector of claim 13 wherein at least one of said fuel injector housing component and said actuator valve assembly includes a fuel transfer passage opening to said fuel transfer cavity.

15. The fuel injector of claim 14 wherein said actuator valve assembly is operably connected to an electronic actuator;
    said electronic actuator has an activated state and a deactivated state; and
    said fuel pressurization chamber is closed from fluid communication with said fuel transfer passage when said electronic actuator is in said activated state.

16. The fuel injector of claim 15 wherein said set of external threads has a peak diameter; and
    a lower area adjacent said last internal thread has a diameter greater than said peak diameter.

17. The fuel injector of claim 16 wherein an upper area adjacent said first internal thread has a uniform diameter.

18. The fuel injector of claim 17 wherein a cam driven tappet is operably connected to said fuel injector housing component.

19. The fuel injector of claim 18 wherein said set of internal threads are uniform; and
    said set of external threads are uniform.

* * * * *